Aug. 16, 1932.   I. JEPPSSON ET AL   1,871,700
SHEARING MACHINE
Filed March 19, 1932   3 Sheets-Sheet 2

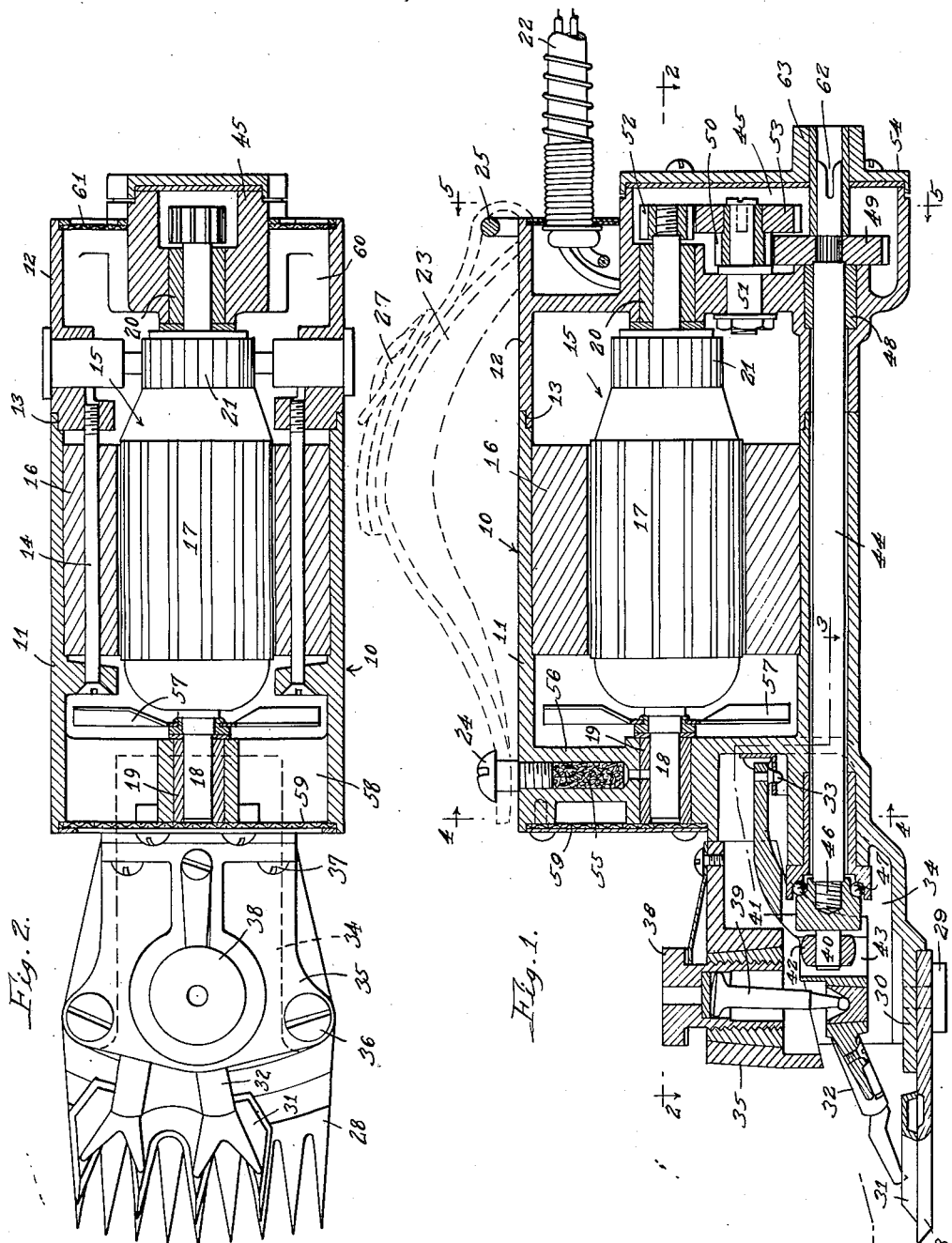

Inventor:
Ivar Jeppsson &
Edwin J. Bartlett
By Wilson, Dowell, McCanna & Rehm
Attys.

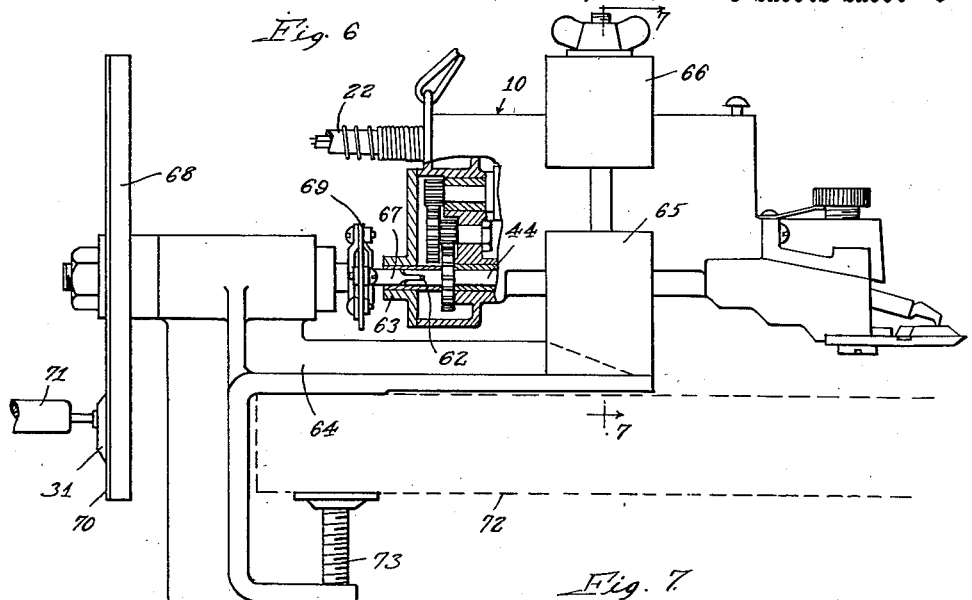
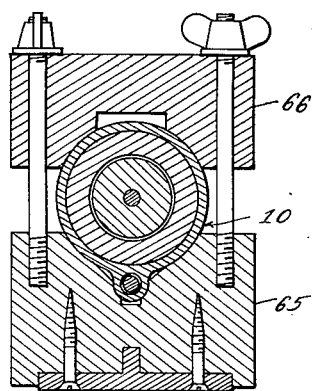
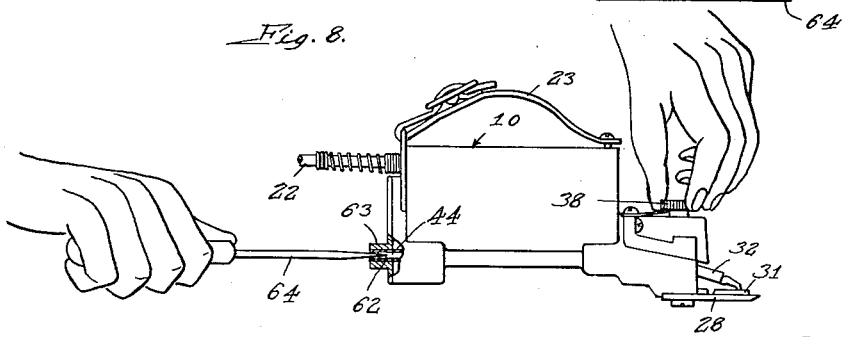

Patented Aug. 16, 1932

1,871,700

UNITED STATES PATENT OFFICE

IVAR JEPPSSON, OF CHICAGO, AND EDWIN S. BARTLETT, OF FOREST PARK, ILLINOIS, ASSIGNORS TO CHICAGO FLEXIBLE SHAFT COMPANY, OF CHICAGO, ILLINOIS, A CORPORATION OF ILLINOIS

SHEARING MACHINE

Application filed March 19, 1932. Serial No. 600,006.

This invention relates to animal shears generally and is particularly concerned with an electric sheep shearing machine.

The principal object of our invention is to provide a machine having the electric motor mounted inside the handle so as to eliminate the conventional flexible drive shaft extending to the handle, the machine being so designed and constructed to secure proper balance and eliminate any tendency toward awkwardness in the handling thereof. In carrying out this object we have made the frame of the machine, which serves as the motor housing, as well as a handle, with a front portion on which the comb is carried projecting as little as possible from the end of the handle, and have mounted a driving spindle lengthwise of the bottom of the frame for connection at its front end with the cutter and connection at its rear end with the motor through suitable gears in a gear box at that end of the handle.

Another important object consists in slotting the rear end of the longitudinal driving spindle and leaving this slotted end exposed for the double purpose of enabling one to use the spindle of the machine for driving a grinder used in sharpening combs and cutters, and to enable one to insert a screw driver into the slot to turn the spindle while adjusting the tension nut, whereby to accurately gauge the tension adjustment.

Other objects and advantages of our invention will appear in the course of the following detailed description, in which reference is made to the accompanying drawings, wherein—

Figure 1 is a longitudinal vertical section through a shearing machine embodying our invention;

Fig. 2 is a horizontal section on the line 2—2 of Figure 1 showing the shearing end in elevation;

Fig. 6 is a view showing how the machine may be used for driving a grinder;

Fig. 7 is a cross-section on the line 7—7 of Fig. 6, and

Fig. 8 is a view showing how the tension of the machine is adjusted.

The same reference numerals are applied to corresponding parts throughout the views.

Figure 4:
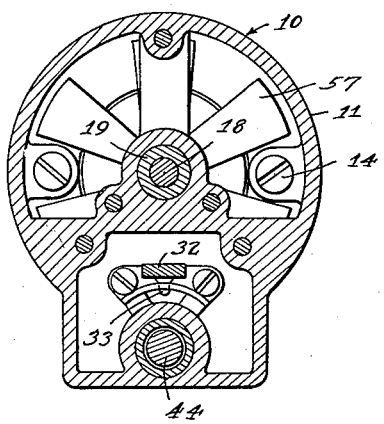
Figs. 4 and 5 are cross-sections on the correspondingly numbered lines of Figure 1.
Figure 5:
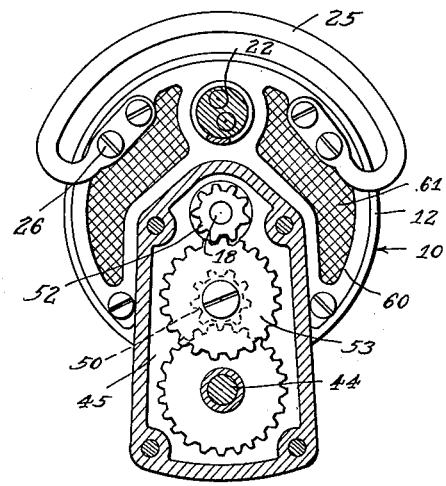
Figure 3:
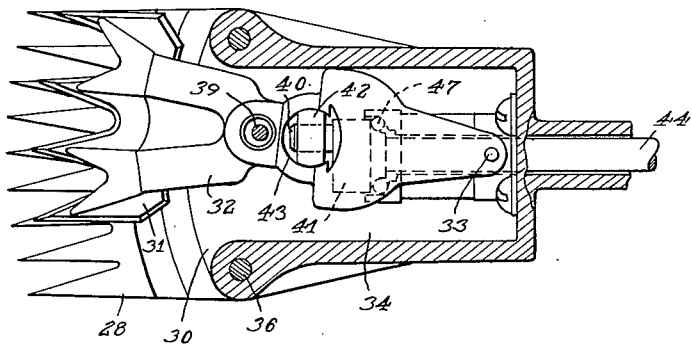
Fig. 3 is a horizontal section on the broken line 3—3 of Figure 1.

Referring to the drawings and particularly Figs. 1 and 2, the frame, which forms the handle of the machine, is designated generally by the reference numeral 10 and is illustrated as made up of two sections, a front section 11 and a rear section 12 generally circular in cross-section and interfitting, as shown at 13. The sections are held together by bolts 14 to form a unitary frame structure serving both as a handle and as a housing for the electric motor, indicated generally by the numeral 15. The pole pieces 16 for the motor are carried in the front section 11 of the frame and have the bolts 14 extended therethrough, as appears in Fig. 2. The armature 17 has the front end of its shaft 18 received in a bearing 19 in the front wall of section 11 and its rear end received in a bearing 20 in the rear wall of section 12. The commutator 21 of the armature has brushes cooperating therewith and mounted in the wall of the rear section 12, as appears in Fig. 2. An extension cord 22 is suitably attached to the rear end of the frame 10 and lead-in wires extend therefrom for connection with the brushes of the motor in any suitable or preferred manner. A switch for controlling the motor can be provided directly on the frame if desired, but is not shown inasmuch as it is often preferred to have the switch interposed at some point in the cord instead of mounted on the machine. The sections 11 and 12 forming the handle are small enough in diameter to fit comfortably in the hand, and to facilitate holding the same we contemplate providing a handle strap 23, similar to that disclosed in our copending application, Serial No. 542,754, filed July 8, 1931. The strap, as illustrated and described in said application, extends lengthwise over the handle and is fastened at its front end by means of a stud 24 so as to permit pivotal movement of the strap to right or left. An arcuate guide 25 fastened, as at 26, to the back of the handle has the rear end of the strap entered under it and buckled, as at 27, so as to fit snugly over the hand, whereby to enable the operator to manipulate the machine without keeping a tight hold thereon, such as might otherwise mean fatigue in the course of a few hours' work. The strap is slidable on the guide 25 to the right or left from a mid-point for right handed or left handed grasping of the handle.

The shearing end of the machine is made up of a comb 28 removably secured, as at 29, to an integral extension 30 of the frame. The extension 30 is integral with the bottom of the front section 11 and is made so as to locate the comb 28 as close as possible to the end of the handle for a purpose to be described presently. A cutter 31 is reciprocable on the comb by means of a forked tension arm 32 which finds a bearing support at its rear end underneath the front bearing 19 of the armature shaft, as indicated at 33. The frame extension 30 is formed so as to provide a housing 34 for the oscillating fork 32 and its operating means. A cover piece 35 fastened, as at 36 and 37, forms the top wall of this housing, and has an adjustable tension nut 38 threaded therein to impose pressure on the fork 32 through an oscillating pintle 39 in a well known manner, and keep the cutter 31 under proper tension. A crank pin 40 on a driving head 41 carries a ball 42 fitting in a vertical guideway 43 on the fork 32, whereby to oscillate the fork in the turning of the head in the usual way. No invention is claimed in the operating mechanism itself, the same being well known in this art. However, we shall now point out certain novel features with respect to the arrangement of the cutter operating mechanism relative to the motor 15 from which the drive is taken, and also the novel means employed for transmitting power from the motor to said mechanism.

In accordance with our invention, instead of having the motor 15 connected at its front end with the cutter operating mechanism, which would necessitate all of the mechanism as far back as the pivot 33, and more, extending out in front of the motor housing, we have provided the driving spindle 44 extending rearwardly from the mechanism below the motor for its driving connection at the rear end with the motor through suitable gears in a gear box 45 provided on the rear end of the handle. This permits overlapping, as it were, the front end of the motor with the rear end of the cutter operating mechanism to such an extent that good balance of the machine is secured and all awkwardness in the handling thereof eliminated. Furthermore, this gives better distribution of weight because, instead of having the cutter operating mechanism, along with some suitable means for interconnecting the mechanism with the motor, all at the front end of the handle, the gears and gear box are provided at the rear end of the handle and serve to balance the weight of the cutter operating mechanism at the front end, with relation to the point where the handle is grasped, thus making for good "feel" and greatly facilitating manipulation of the machine. The spindle 44 is fastened at 46 to the head 41 which, in turn, is mounted in an anti-friction bearing 47 provided on the front end of the handle. A plain bearing 48 is provided in the rear end of the handle through which the spindle 44 extends into the gear box 45. A gear 49, suitably fixed on the spindle 44 in the gear box, meshes with a pinion 50 carried on a stud 51 mounted between the spindle 44 and the armature shaft 18 of the motor. A pinion 52 fixed on the projecting end of the armature shaft 18 in the gear box meshes with a gear 53 turning with the pinion 50 on the stud 51, whereby to provide a two step reduction between the motor and the spindle 44. The gear box 45 can, of course, be filled with a suitable lubricant before the cover 54, serving as a closure for the gear box, is fastened in place. This will assure lubrication of the gears as well as the bearings 20 and 48 practically indefinitely. In passing, it will be seen that a small reservoir 55 for lubricant is provided in the web 56 formed as part of the front wall of section 11 over the bearing 19. The reservoir 55 communicates with the bearing 19 at its lower end, as shown, and is arranged to be closed by means of the screw end of the stud 24 previously referred to. If desired, a suitable wick may be inserted in the reservoir 55 to hold a fluid lubricant. The bearing 47 is accessible from the front end of the machine for oiling at the same time when the cutter operating mechanism is oiled.

The armature shaft 18 carries a fan 57 thereon immediately behind the bearing 19. Passages 58 are cored in the section 11 to either side of the web 56 so as to permit discharge of air forwardly through a screen 59 over the shearing end of the machine. Other passages 60 are cored in the section 12 to either side of the gear box 45 for the admission of air drawn in by the operation of the fan 57, and it is evident that the air will, therefore, be circulated around the gear box and through the motor housing before it is discharged at the front end of the machine. That insures keeping the motor cool enough so that there will be no danger of damage by overheating and, furthermore, no likelihood of discomfort due to heating of the motor housing which, as stated before, serves as a handle. The circulation of air around the gear box 45 also keeps the lubricant therein at a moderate temperature, such that it does not flow so easily as to get beyond the parts intended to be lubricated thereby. A suitable screen 61 is also provided in the rear end of the machine so that there will be no danger of dirt or wool being carried in with the air.

The spindle 44 is illustrated as having a slotted extension 62 fitting in a suitable open boss 63 provided on the cover 54, whereby to afford access thereto from the rear end of the handle for either one of two purposes, as illustrated in Figs. 6 and 8. Referring to Fig. 8, it will be seen that a screw driver 64 can be inserted into the slotted extension 62 through the boss 63 to permit turning the spindle 44 by hand while the tension nut 38 is being adjusted. In that way, the operator can judge what amount of tension he is putting on the cutter. Without this means of checking the tension it was largely a matter of guess-work to adjust the tension on a cutter, and few operators could be relied upon to make a proper tension adjustment.

Referring to Fig. 6, the machine of our invention is shown clamped to the frame 64 of a grinder between jaws 65 and 66, the jaws being formed to fit the handle of the machine. The spindle 44 of the machine receives a stub shaft 67 in its slotted end 62 whereby to drive the wheel 68 of the grinder through a suitable flexible coupling 69. The flat face of the wheel 68 has emery cloth thereon, as indicated at 70, and a cutter or comb to be ground is arranged to be pressed against the wheel by any suitable means, such as a holder indicated at 71. The grinder is illustrated as clamped to a suitable support 72 by means of a hand screw 73. It is manifest that our invention enables an operator to use the motor of his shearing machine for operation of a grinder and the latter may be of such a form that it can be carried along to the job in the operator's kit so as to be handy for immediate use whenever the operator finds it necessary to sharpen his cutters or combs.

It is believed the foregoing description conveys a good understanding of the objects and advantages of our invention. The appended claims have been drawn so as to cover all legitimate modifications and adaptations.

We claim:

1. In a shearing machine, the combination of a hollow handle having a motor mounted therein, a comb on the front end of the handle, a cutter movable on the comb, cutter operating mechanism on the front end of the handle for moving the cutter, and means on the rear end of the handle driven by the motor and operatively connected with the aforesaid mechanism for transmitting drive to the latter.

2. In a hand tool, the combination of a handle having a motor mounted therein, a tool to be operated carried on the front end of the handle, tool operating mechanism on the front end of the handle operatively connected with the tool, and means on the rear end of the handle driven by the motor and operatively connected with the aforesaid mechanism for transmitting drive thereto.

3. In a shearing machine, the combination of a hollow elongated handle having a motor mounted therein lengthwise with respect thereto, a comb on the front end of the handle, a cutter movable on the comb, cutter operating mechanism carried on the front end of the handle and operatively connected with the cutter, a driving spindle extending lengthwise of the handle and operatively connected at its front end with the cutter operating mechanism, and means on the rear end of the handle for transmitting drive from the rear end of the motor to the rear end of said spindle.

4. In a shearing machine, the combination of a hollow elongated handle having a motor mounted therein with the driving shaft thereof extending lengthwise with respect to the handle, a comb on the front end of the handle, a cutter movable on the comb, and a driving spindle extending lengthwise of the handle and operatively connected at its front end with the cutter and at its rear end with the rear end of the driving shaft of the motor.

5. In a shearing machine, the combination of a hollow handle having a motor mounted therein, a comb on the front end of the handle below the plane of the bottom thereof, a cutter movable on the comb, cutter operating mechanism on the front end of the handle for moving the cutter, and means on the rear end of the handle driven by the motor through direct operating connection therewith and operatively connected with the aforesaid mechanism through a member extending lengthwise relative to the bottom of the handle for transmitting drive to the mechanism.

6. In a hand tool, the combination of a handle having a motor mounted therein, a tool to be operated carried on the front end of the handle adjacent the bottom thereof, tool operating mechanism on the front end of the handle operatively connected with the tool, and means on the rear end of the handle driven by the motor through a direct operating connection therewith and operatively connected with the aforesaid mechanism through a member extending lengthwise relative to the bottom of the handle for transmitting drive to the mechanism.

7. In a shearing machine, the combination of a hollow elongated handle having a motor mounted therein lengthwise with respect thereto, a comb on the front end of the handle below the plane of the bottom thereof, a cutter movable on the comb, cutter operating mechanism carried on the front end of the handle and operatively connected with the cutter, a driving spindle extending lengthwise of the bottom of the handle and operatively connected at its front end with the cutter operating mechanism, and means on the rear end of the handle for transmitting drive from the rear end of the motor to the rear end of said spindle.

8. In a shearing machine, the combination of a hollow elongated handle having a motor mounted therein with the driving shaft thereof extending lengthwise with respect to the handle, a comb on the front end of the handle adjacent the bottom thereof, a cutter movable on the comb, and a driving spindle extending lengthwise of the bottom of the handle and operatively connected at its front end with the cutter and at its rear end with the rear end of the driving shaft of the motor.

9. In a device of the character described, the combination of a hollow elongated handle having a motor mounted therein with the driving shaft thereof disposed lengthwise with respect thereto, cutter means carried on the front end of the handle adjacent the bottom thereof, a driving spindle extending lengthwise of the handle below the motor and operatively connected at its front end with the cutter means, and means providing an operating connection between the rear end of said spindle and the rear end of the driving shaft of said motor, the front end of the handle being constructed so that the front end of the motor overlies the rear end of the cutter means, whereby to reduce the over-all length of the device and particularly that portion of the cutter means projecting forwardly from the handle.

10. In a shearing machine, the combination of an elongated hollow handle, a comb carried on the front end of said handle adjacent the bottom thereof, a cutter reciprocable on the comb, an oscillating member pivotally mounted at its rear end on the handle and operatively connected at its front end with the cutter for reciprocating the same, a motor mounted in the handle with its driving shaft disposed lengthwise thereof, the front end of said motor being disposed in overlapping relation to the rear end of said oscillating member, a rotary driving head below and intermediate the ends of said member and connected therewith to transmit oscillatory movement to said member in the turning of said head, and a drive spindle extending lengthwise of the handle below the motor and connected at its front end with said head and having a driving connection at its rear end with the rear end of said motor shaft.

11. In a shearing machine, the combination of an elongated hollow handle, a comb carried on the front end of said handle adjacent the bottom thereof, a cutter reciprocable on the comb, an oscillating member pivotally mounted at its rear end on the handle and operatively connected at its front end with the cutter for reciprocating the same, a motor mounted lengthwise in the handle with the driving shaft thereof received in front and rear bearings provided in said handle, a driving spindle mounted in the bottom of the handle and extending lengthwise thereof, said spindle having a driving connection at its front end with the oscillating member intermediate the ends of the latter whereby to communicate oscillatory movement to said member in the turning of said spindle, and means providing a driving connection between the rear end of said driving shaft and the rear end of said spindle.

12. In a device of the class described, the combination of a hollow handle having a motor mounted therein, a comb on the front end of the handle, a cutter movable on the comb, means for operating the cutter, a manually adjustable tension device for keeping the cutter operating under tension, a driving spindle connected with the cutter operating means and extending rearwardly therefrom lengthwise of the handle, the rear end of said spindle being accessible from outside the handle so as to permit manually turning the same when it is desired to determine the tension on the cutter, and means providing an operating connection between the motor and the spindle for power operation thereof.

13. In a device of the class described, the combination of a hollow handle having a motor mounted therein, a comb on the front end of the handle, a cutter movable on the comb, means for operating the cutter, and means providing a driving connection between the motor and the cutter operating means, said means including a member arranged to turn when the cutter operating means is operated and having one end thereof accessible from outside the handle and constructed to make a detachable operating connection with a device to be driven thereby, whereby to permit use of the motor for other purposes besides driving the cutting operating means.

14. A device as set forth in claim 13 including a manually adjustable tension device for placing the cutter under tension, and wherein the member arranged to turn in the operation of the cutter operating means is constructed to be turned manually by engagement of a tool with the accessible end of said member, whereby to permit manually operating the cutter to determine the tension thereon.

15. A hand tool of the class described comprising a hollow handle having a motor mounted therein, a comb on the front end of the handle, a cutter movable on the comb, a driving spindle operatively connected at its front end with the cutter to move the same in the turning of the spindle, there being a manually adjustable tension device for placing the cutter under variable tension, the rear end of said spindle being exposed at the rear end of the handle so as to be accessible for engagement of a tool therewith to permit manually turning the spindle during adjustment of the tension device so as to secure correct tension on the cutter, and also to permit detachably connecting a device to said spindle whereby to operate the device from the spindle, and reduction gearing for driving the spindle at a certain reduced speed with relation to the speed of the motor.

16. In a device of the character described, the combination of a hollow elongated handle having a motor mounted therein with the driving shaft thereof disposed lengthwise relative to the handle, a tool operable on the front end of the handle, a shaft operatively connected at its front end with the tool and extending rearwardly therefrom lengthwise of the handle, and means providing a reduction driving connection between said shafts, the rear end of one of said shafts being extended and made accessible from the rear end of the handle and constructed so as to permit detachably connecting the shaft with another device to be driven, whereby to permit use of the motor for other purposes besides driving the aforesaid tool.

17. In a shearing machine, the combination of a hollow elongated handle having a motor mounted lengthwise therein with the driving shaft thereof projecting through a bearing provided in the rear end of said handle, a comb on the front end of the handle, a cutter movable on the comb, a driving spindle extending lengthwise of the handle operatively connected at its front end with the cutter and having the rear end thereof projecting through a bearing provided in the rear end of the handle, a housing on the rear end of said handle having the rear ends of the shaft and spindle projecting therein, means in the housing providing a driving connection between the shaft and spindle, the gear box being adapted to contain lubricant for lubrication of said means and of the bearings for the shaft and spindle which communicate with the housing, and a closure for said housing.

18. A shearing machine as set forth in claim 17 including an opening provided in said closure, and a drive extension on said spindle projecting into said opening.

19. A hand tool of the character described comprising a hollow elongated handle having a motor mounted lengthwise therein, the motor having a driving shaft received in suitable bearings provided therefor in said handle, a tool operatively mounted on the handle, means providing a driving connection between the driving shaft and said tool, a strap extending lengthwise over the top of the handle to fit over the top of the operator's hand grasping the handle to facilitate holding the tool, a removable screw for fastening one end of the strap to the handle, said screw serving as a closure for a lubricant passage provided in the handle communicating with one of the bearings for the driving shaft, and means for fastening the other end of the strap to the handle.

20. A hand tool of the class described comprising an elongated handle having a drive shaft extending lengthwise therein and received in one or more suitable bearings provided in said handle, a tool operatively mounted on said handle and driven by said shaft, a strap extending lengthwise over the top of the handle to fit over the top of the operator's hand grasping the handle to facilitate holding the tool, a removable screw for fastening one end of the strap to the handle, said screw serving as a closure for a lubricant passage provided in the handle communicating with one of the bearings for the driving shaft, and means for fastening the other end of the strap to the handle.

In witness whereof we have hereunto affixed our signatures.

IVAR JEPPSSON.
EDWIN S. BARTLETT.